Patented Aug. 11, 1953

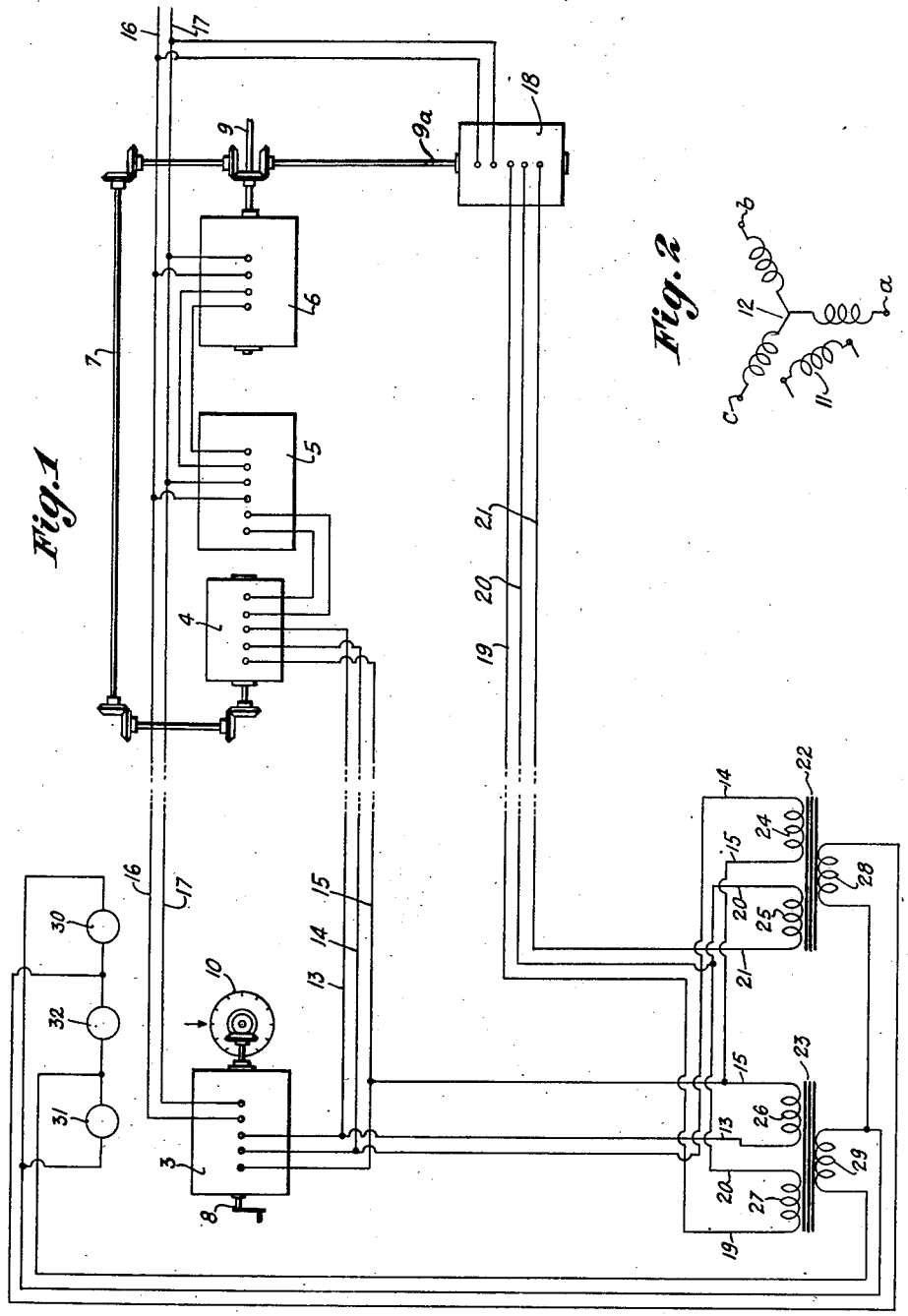

2,648,834

UNITED STATES PATENT OFFICE 2,648,834

POSITIONAL CORRESPONDENCE INDICATOR FOR SERVO MECHANISMS

Edward Lohse, Brooklyn, and Stanley H. Gross, New York, N. Y., assignors to Control Instrument Company, Inc., Brooklyn, N. Y., a corporation of New York Application June 24, 1950, Serial No. 170,122

5 Claims. (Cl. 340—268)

1

This invention relates to servo mechanisms used for positioning, and has particular reference to a means for indicating a non-correspondence between the input and the output of such a servo mechanism.

In many applications, the load positioned by a servo mechanism cannot be observed by the operator, and the failure of the load to follow the controller may result in damage to equipment and to personnel, as for instance in the case of the positioning of guns. It is, therefore, an object of this invention to provide an improved means whereby any failure on the part of the load to assume correctly the position required of it by the controller, will be indicated to the operator immediately.

These and other objects of the invention will be made apparent from the specification and drawing, which illustrate an embodiment of the inventive idea herein contained; it being understood, however, that they are intended merely to illustrate rather than limit and define the invention, reference being had to the appended claims for that purpose.

In the drawing:

Fig. 1 is a schematic diagram showing the invention applied to a conventional servo mechanism; and Fig. 2 is a schematic representation of the synchro generators employed therein.

Referring to Fig. 1, the device of the present invention is shown together with a servo mechanism wherein it will function to indicate lack of positional correspondence between controller and load. The servo mechanism comprises a synchro generator 3, a control transformer 4, servo amplifier 5, servomotor 6, and mechanical feedback link connections 7, all in a conventional arrangement such that the positioning of shaft 8 of the synchro-generator 3 will cause the shaft 9 of the servomotor 6, and consequently any load attached thereto, to be positioned in angular correspondence. The dial 10 is geared to the shaft 8 and provided so that the operator at the synchrogenerator 3 may have an indication of the position he may set, which position is required to be reproduced by the servo mechanism system.

Synchro generator 3 is more explicitly shown in Fig. 2 wherein the rotor 11 and star connected stator 12 are illustrated, so that the function of the invention may be more clearly described. A delta connected stator could also be employed and the following discussion, with minor changes, would be equally applicable to this purpose, as would a three wire, two phase generator.

For every possible position of the rotor 11 the

2 distribution of voltages in the stator 12 will be uniquely different. If we energize the rotor thereof from a single phase source such as that on the leads 16 and 17, the voltages in these coils, taken between their terminals $a$, $b$ and $c$ will be $$V_{ca} = KV_m \sin(\varphi + 270) \sin \omega t$$
$$V_{bc} = KV_m \sin(\varphi + 150) \sin \omega t$$
$$V_{ab} = KV_m \sin(\varphi + 30) \sin \omega t$$

where $K$=transformer ratio of the synchro, $V_m$=maximum line voltage energizing the rotor, $\varphi$=positional angle of shaft 8 from an arbitrary zero, $\omega = 2\pi$ times the frequency of power source of rotor energy, $t$=time, and $V_{ac} = -V_{ca}$=the voltage with an appropriate sign instantaneously measured between the terminals $a$ and $c$.

Since these voltages are in phase we may omit the constant multiplier $\sin \omega t$ from our future notation and also refer our zero of shaft position arbitrarily to any angle as a point of beginning.

It is at once apparent that these voltages are unique functions of the angular position of the rotor, so that for synchro-generator 3 in any position of the shaft 8, there will be one and only one distribution of voltages between the leads 13, 14 and 15 which terminate its stator coils and, therefore, on the transmission line, determining the position to be assumed by the load (not shown) coupled to the shaft 9 of the servomotor 6.

Also coupled to the shaft 9 and positioned thereby is a second synchro generator 18 which is similar in construction to the controlling synchro generator 3 and whose rotor is positioned by shaft 9a and energized from the same power source lines 16 and 17 and in the same phase sequence as the rotor of synchro 3. It follows, therefore, that the voltages on the leads 19, 20 and 21 will have the same sequence and the same magnitudes as the voltages on the leads 13, 14 and 15 provided that both synchros have the same angular position.

We are, therefore, provided with two sets of voltages, such that $$V_{13-14} = V_{19-20}$$
$$V_{14-15} = V_{20-21}$$
$$V_{15-13} = V_{21-19}$$

when there is physical correspondence in angular position of the load positioning shaft 9 and the input synchro generator positioning shaft 8.

These voltages are coupled to the transformers 22 and 23 so that in the primary 24 of transformer 22 we have $V_{14-15}$ and in primary 25 thereof $V_{20-21}$, with the directions of the windings such or the polarity of connection so made that the flux in the core of transformer 22 is equal to the difference in the fluxes individually generated by each of these windings. In the same way, in the primary 26 of transformer 23 we have $V_{15-13}$ and in the primary 27 thereof $V_{21-19}$ again so phased that the net flux is the result of the difference between these two quantities.

The voltage in the secondary 28 of transformer 22 will be determined by the difference between the voltages in the primary windings 24—25, and subject to step up by the transformer turns ratio. If the synchro 3 and synchro 18 are, as they should be, in similar positions, the net primary voltage will be $V_{14-15} - V_{20-21} = 0$; and in the same way, the net voltage of transformer 23 will be $V_{15-13} - V_{21-19} = 0$.

Under these conditions the secondary voltages will also be zero and the indicators 30, 31 and 32 which are connected to the secondaries 28 and 29 of transformers 22 and 23 and across their output, will be unaffected. If, however, the controller calls for a given position and the load comes to rest in a position other than that indicated by the controller then the voltages will be $$V_{13-14} \neq V_{19-20} = kV_m \sin([\phi+\psi]+30)$$
$$V_{14-15} \neq V_{20-21} = kV_m \sin([\phi+\psi]+150)$$
$$V_{15-13} \neq V_{21-19} = kV_m \sin([\phi+\psi]+270)$$

where $\psi$ is angle of error between the position $\phi$ required by the controller and the position assumed by the load.

There will be, therefore, a net difference between the voltages in the two halves of the primaries of each of the transformers 22 and 23 and, in consequence thereof, a voltage will be induced in each of their secondaries 28 and 29, which voltage will cause the signal lights to be activated.

This condition may be brought about by any failure in the servo system whether that failure occurs in the transmission lines by reason of open or short circuit, in the amplifier, in the servomotor, the feedback connections or any other component therein.

As has been mentioned, the indicator lamps 30, 31 and 32 are connected, respectively, across secondary 28 alone, secondary 29 alone and across secondaries 28 and 29 in series. In the event that the voltages between the corresponding leads of the input synchro generator 3 and the output synchro generator 18 do not compare, for the reason that the shafts of the aforesaid synchros do not have corresponding angular positions, the lamps, either singly or together, will immediately indicate that condition of non-correspondence due to the difference voltages which will therefore exist either between the comparable pairs of leads per se or the difference between the sequence of voltages on the leads even though they may be the same, these difference voltages being developed either across or between the secondaries of the transformers 22 and 23.

Since any improper function of the servo will cause such an indication, the transformers and indicators should be connected at the control synchro 3 by the shortest possible leads so that all the faults which may develop in the servo system will be indicated within the loop between the connection thereto and the output generator 18.

Any form of detector may be employed, lamps, relays or electron tubes included, depending upon the accuracy and sensitivity required of the system. Lamps have been used for illustration, but tend, because of the power required for their operation, to be least sensitive detectors. High ratio transformers giving large voltage outputs coacting with gas discharge tubes, and electronic detectors, are detectors of increasing sensitivity which may be employed in place of lamps, where increased sensitivity is required.

What is claimed is:

1. In a device to indicate lack of positional correspondence in a servo mechanism having a positionable input means and a positioning output means responsive thereto, the combination comprising means coacting with said positionable input means for generating a plurality of variable voltages in phase with each other and whose relative magnitudes and instantaneous polarities are a unique function of the position of said input means, means coacting with said positioning output means for generating a plurality of variable voltages in phase with each other and whose relative magnitudes and instantaneous polarities are a unique function of the position of said positioning output means, means for comparing the two sets of voltages thus obtained, and indicating means responsive to said comparing means for actuation thereby in the event that said voltages do not compare.

2. In a device to indicate lack of positional correspondence in a servo mechanism having a positionable input means and a positioning output means responsive thereto, the combination comprising means for generating a plurality of variable voltages in phase with each other and whose relative magnitudes and instantaneous polarities are a unique function of the position of said input means, means coacting with said positioning output means for generating a plurality of variable voltages in phase with each other and whose relative magnitudes and instantaneous polarities are a unique function of the position of said positioning output means, a plurality of transformers each coupled to both said generating means aforesaid and to each other so that the voltages therein from each of said generating means are in opposition, and indicating means coupled to said transformer means.

3. In a device to indicate lack of positional correspondence in a servo mechanism having a positionable input means and a positioning output means responsive thereto, the combination comprising means for generating three variable voltages in phase with each other and whose instantaneous polarity and magnitude is a unique function of the position of said positionable input means, means for generating three variable voltages in phase with each other and whose instantaneous polarity and magnitude is a unique function of the position of said positioning output means, means for comparing two of the first named voltages as referred to the third thereof with two of the second named voltages as referred to the third of said second group of voltages, and indicating means coupled to and responsive to said comparing means and actuated when said voltages do not compare.

4. In a device to indicate lack of positional correspondence in a servo mechanism having a positionable input means and a positioning output means responsive thereto, the combination comprising means for generating three variable voltages in phase with each other and whose instantaneous polarity and magnitude is a unique function of the position of said positionable input means, means for generating three variable voltages in phase with each other and whose instantaneous polarity and magnitude is a unique function of said positioning output means, means comprising a pair of transformers each having a plurality of primary windings coupled to said voltage generating means so that the voltage therefrom due to each thereof flows in opposition in each of said transformer means and a secondary winding, and indicating means coupled to said secondary windings.

5. In a device to indicate lack of positional correspondence in a servo mechanism having a positionable input means and a positioning output means responsive thereto, the combination comprising means for generating three variable voltages in phase with each other and whose instantaneous polarity and magnitude is a unique function of the position of said positionable input means, means for generating three variable voltages in phase with each other and whose instantaneous polarity and magnitude is a unique function of said positioning output means, means comprising a pair of transformers each having two primary windings and each having one primary coupled to one voltage from each of said voltage generating means and the secondary winding and indicating means coupled to said secondary windings.

EDWARD LOHSE.
STANLEY H. GROSS.

References Cited in the file of this patent

UNITED STATES PATENTS

| Number | Name | Date |
|---|---|---|
| 749,252 | Andrews | Jan. 12, 1904 |
| 1,145,348 | Carter | July 6, 1915 |
| 1,719,506 | Field | July 2, 1929 |
| 2,388,977 | Johnson | Nov. 13, 1945 |
| 2,405,568 | Ferrill, Jr. | Aug. 13, 1946 |
| 2,420,193 | Rich | May 6, 1947 |
| 2,428,402 | Winterbottom | Oct. 7, 1947 |